United States Patent
Graze, Jr.

(10) Patent No.: US 6,752,856 B1
(45) Date of Patent: Jun. 22, 2004

(54) FEEDBACK LOOP CONTROLLED MULTISTAGE AEROSOL REMOVAL DEVICE

(75) Inventor: Russell R. Graze, Jr., Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/302,115

(22) Filed: Apr. 29, 1999

(51) Int. Cl.$^7$ .............................................. B01D 50/00
(52) U.S. Cl. ........................... 95/268; 95/269; 96/190; 55/315.1; 55/320; 55/337; 55/433; 55/465; 55/DIG. 19
(58) Field of Search ......................... 96/188, 189, 190; 55/315.1, 320, 332, 337, 385.3, 433, 453, 447, 465, 520, DIG. 19; 95/288, 268, 269; 123/573

(56) References Cited

U.S. PATENT DOCUMENTS

| | | | |
|---|---|---|---|
| 1,917,606 A | * | 7/1933 | Sillers .......................... 96/188 |
| 3,087,474 A | * | 4/1963 | Catha .......................... 123/573 |
| 3,654,748 A | * | 4/1972 | Bloom .......................... 55/337 |
| 5,058,440 A | | 10/1991 | Graze, Jr. ................. 73/863.83 |
| 5,479,907 A | | 1/1996 | Walker, Jr. ................... 123/573 |
| 5,499,616 A | | 3/1996 | Enright ........................ 123/572 |
| 5,507,268 A | | 4/1996 | Schlattl ....................... 123/572 |
| 5,542,402 A | | 8/1996 | Lee et al. ..................... 123/573 |
| 5,579,744 A | | 12/1996 | Trefz ........................... 123/573 |
| 5,582,002 A | | 12/1996 | Pattas ............................ 60/274 |
| 5,617,834 A | | 4/1997 | Lohr ............................. 123/572 |
| 5,622,156 A | | 4/1997 | Rose et al. .................. 123/573 |
| 5,690,084 A | | 11/1997 | Gunji et al. ................. 123/572 |
| 5,697,349 A | | 12/1997 | Blum .......................... 123/572 |

FOREIGN PATENT DOCUMENTS

| | | | | |
|---|---|---|---|---|
| GB | WO88/06058 | * | 8/1988 | .................. 55/337 |

* cited by examiner

Primary Examiner—Robert Hopkins
(74) Attorney, Agent, or Firm—Howard & Howard

(57) ABSTRACT

An assembly for removing aerosol from crankcase gasses being returned to an air intake manifold is generally shown at and includes a housing having a housing wall defining a top portion and a base with at least one drain. An inlet line extends through the housing wall communicating with a crankcase. An outlet line extends through the top portion for communicating with an air intake manifold. An inertial separator generally shown at is attached to the inlet line and has a screen through which the crankcase gasses pass and an impacter plate for obstructing aerosol suspended in the gasses. A sheet wound in spaced convolutions to define a spiraled path from the exterior to a central space conveys gasses from the inertial separator to the central space. A thermal interception tube located in the central space receives gasses and has a tube wall for gasses to pass therethrough and an opening at one end for egress of gasses.

17 Claims, 3 Drawing Sheets

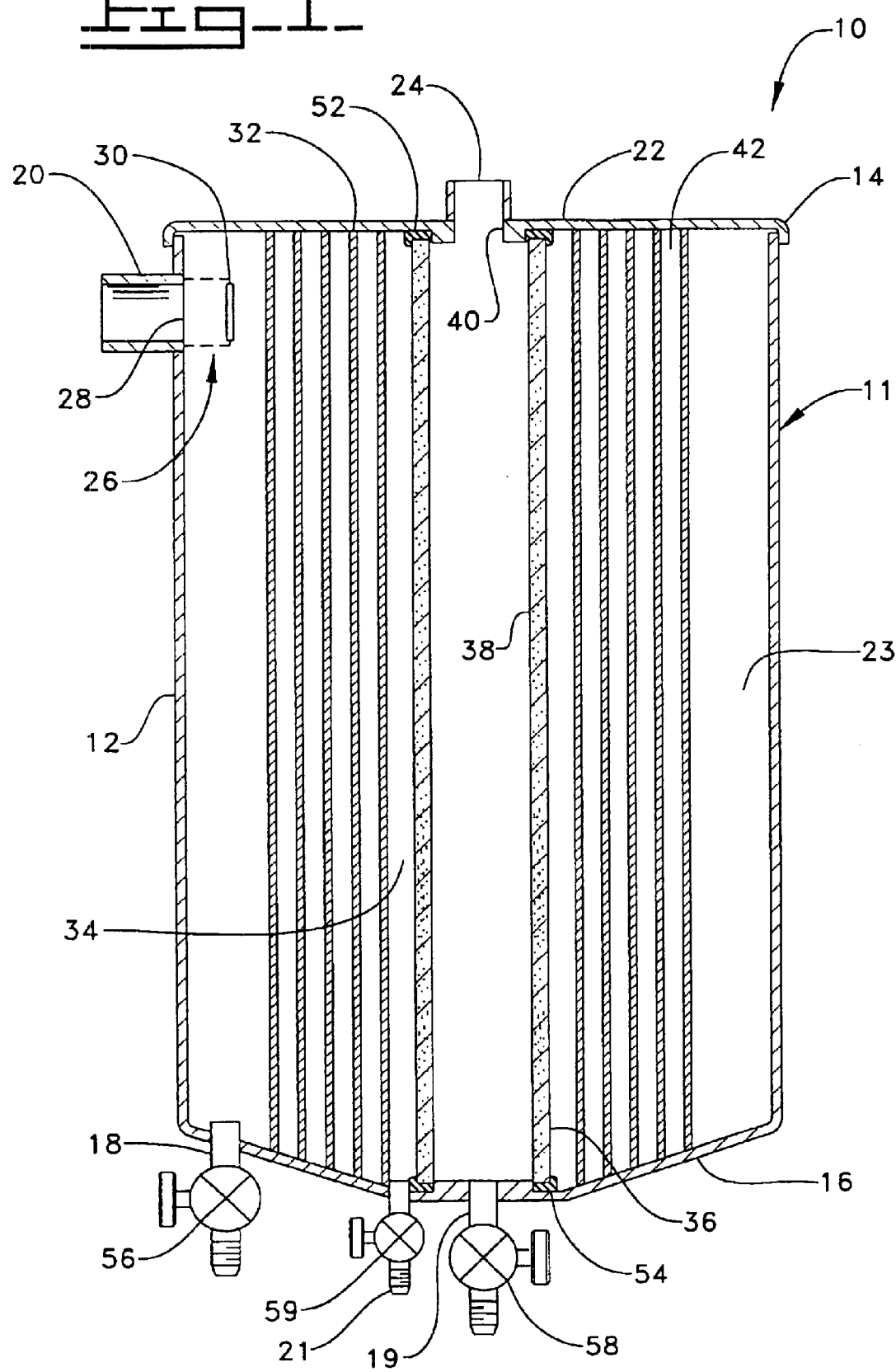

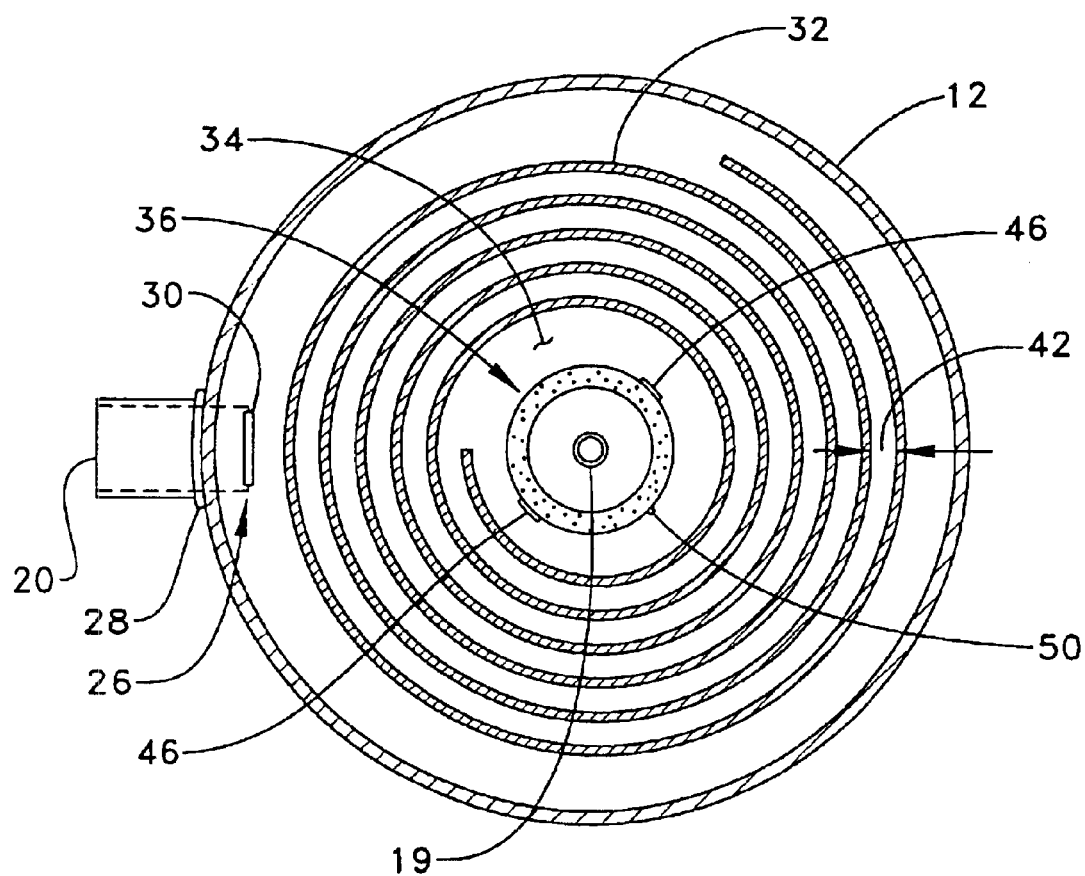
Fig_2_

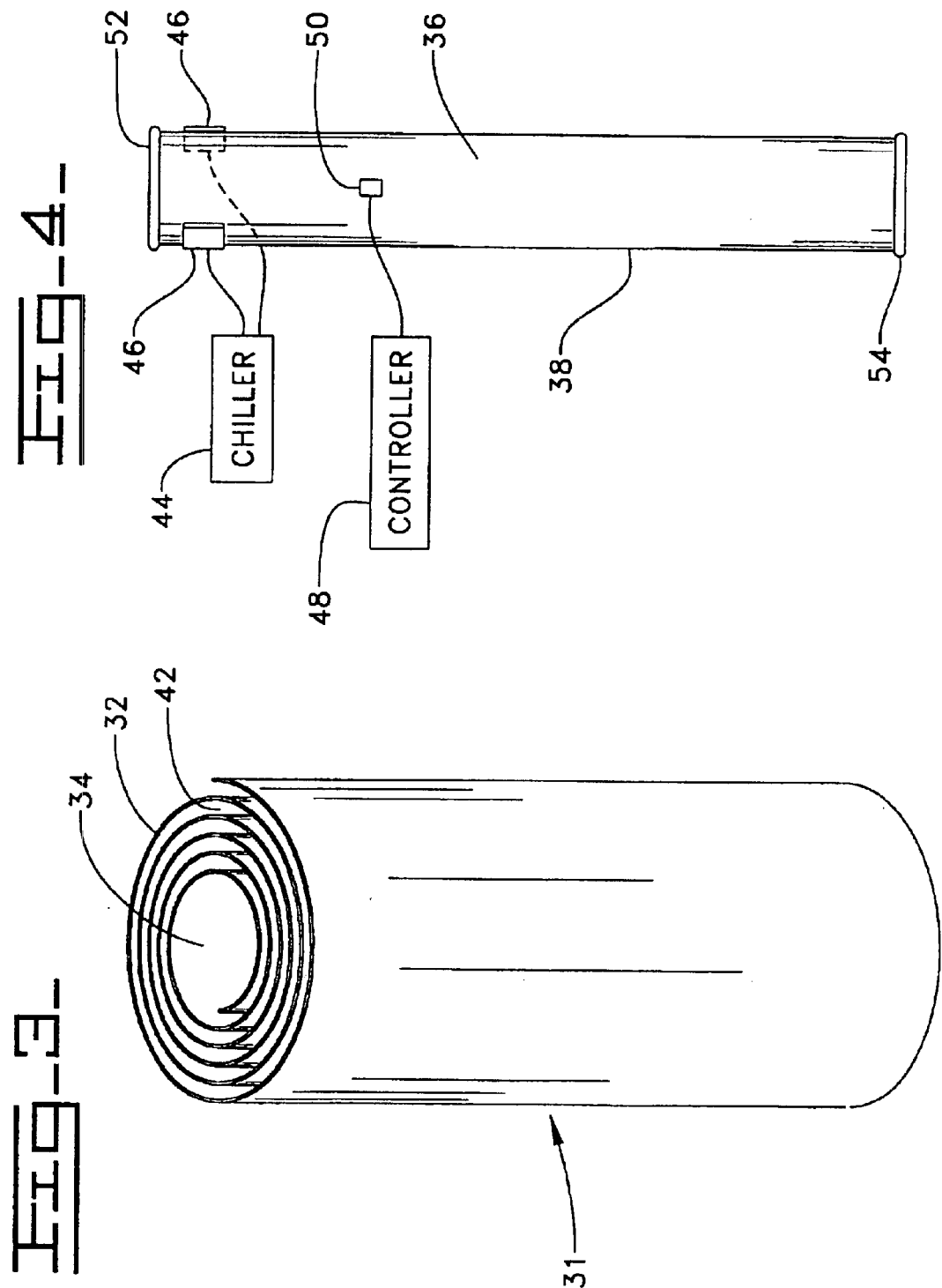

FEEDBACK LOOP CONTROLLED MULTISTAGE AEROSOL REMOVAL DEVICE

TECHNICAL FIELD

The subject invention relates to an improved design for a device that removes aerosol from crankcase gasses from an internal combustion engine for return to an air intake manifold.

BACKGROUND ART

Increasingly strict emission laws for internal combustion engines have led to the development of devices to both improve engine efficiency and reduce volatile emissions to the environment. One method to do so has involved recycling blowby gasses from a crankcase. Generally, this process involves recycling gasses that have been stripped of combustion contaminants and returning the gasses to an engine air intake manifold for reintroduction to a combustion chamber. Devices that perform this process typically include a series of baffles having a filter media therebetween. The baffles variously reduce the flow rate of the gasses while the filter media removes aerosol from the gasses. A device with this design requires replacement when the filter media fouls causing a terminal reduction of gas flow.

In the alternative, centrifugal devices have been utilized to filter the blowby gasses for return to an air intake manifold. A centrifugal device provides adequate filtration without the inclusion of a filter media that can foul. However, the device includes moving parts that require replacement when worn.

A device that can perform the requisite filtration without either fouling or wear is preferable over the prior art.

DISCLOSURE OF THE INVENTION

The present invention overcomes the difficulties found in known filters by providing a multistage filter assembly. The assembly of the present invention for removing aerosol from crankcase gasses being returned to an air intake manifold includes a housing having a housing wall defining a top portion and a base with at least one drain. An inlet line extends through the housing wall communicating with a crankcase. An outlet line extends through the top portion for communicating with an air intake manifold. An inertial separator is attached to the inlet line and has a screen through which the crankcase gasses pass and an impacter plate for obstructing aerosol suspended in the gasses. A sheet wound in spaced convolutions to define a spiraled path from the exterior to a central space conveys gasses from the inertial separator to the central space. A thermal interception tube located in the central space receives gasses and has a porous wall for gasses to pass therethrough and a tube opening at one end for egress of gasses.

The invention also incorporates a method for separating aerosol from crankcase gasses. The steps of separating the aerosol from crankcase gasses include the first step of, passing the gasses through a screen and impacting the gasses against an impacter plate for obstructing the aerosol suspended in the gasses. The second step includes circulating the gasses in a spiraled path to a central space to remove the aerosol from the gasses. The final step includes filtering the gasses through a filter disposed in the central space. The cleansed gasses are subsequently returned to an air intake manifold for reintroduction to the combustion chamber.

The subject invention yields improved removal efficiency over the prior art through the utilization of separate filtration stages. In addition, utilizing drain options described herein connected with an engine sump provides periodic or continuous purging of the filtrate without requiring manual replacement or cleaning. Also, the absence of mechanical parts utilized within a centrifugal filter reduces or eliminates the need for service. Finally, the elimination of filter media provides for a longer lasting service free device.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a side view of the subject invention;

FIG. 2 is a top view of the inside of the subject invention;

FIG. 3 is an isometric view of a diffusion battery; and

FIG. 4 is an elevated plan view of a thermal interception tube.

BEST MODE FOR CARRYING OUT THE INVENTION

Referring to the Figures, wherein like numerals indicate like or corresponding parts throughout the several views, an assembly for removing aerosol from crankcase gasses being returned to an air intake manifold is generally shown at 10 including a housing 11 having a housing wall 12 defining a top portion 14 and a base 16 with a first, second and third drains 18,19, and 21. An inlet line 20 extends through the housing wall 12 and communicates with a crankcase (which is not shown). An outlet line 24 extends through the top portion 14 for communicating with an air intake manifold. The outlet line 24 includes a vacuum modulation device(not shown) for controlling the amount of vacuum applied to the crankcase. The device is contemplated to be a throttle valve to maintain pressure control between the air intake manifold (vacuum side) and the crankcase.

An inertial separator 26 is attached to the inlet line 20 and has a screen 28 through which the crankcase gasses pass and an impacter plate 30 for obstructing aerosol suspended in the gasses. The aerosol are separated from crankcase gasses by passing the gasses through the screen 28 and impacting the gasses against the impacter plate 30 to obstruct the aerosol suspended in the gasses. For example, both solid and liquid aerosol are suspended in the crankcase gasses while traveling at a comparatively high velocity. Very large aerosol will be prevented from entering the assembly by the screen 28. Large aerosol, ranging in size from 2–3 microns, will pass through the screen 28. These larger aerosol sizes collide with the impacter plate 30 due to momentum derived from the flow rate of the gasses. After impact, a loss of momentum results and the aerosol are removed from the gasses. The gasses travel around the impacter plate 30 causing a loss of around 25% of the original flow velocity depending upon the aerosol size to be removed. Smaller aerosol will remain suspended in the gasses and will travel around the impacter plate 30 with the gasses.

The inertial separator 26 is in communication with the first drain 18 for abating the aerosol separated from the gasses. Due to gravitational forces the separated aerosol descend to the first drain 18 which is located beneath the inertial separator 26. These aerosol collect above the first drain 18 pending a purging stage described hereinbelow.

A sheet 32 is wound in spaced convolutions to define a spiraled path from the exterior to a central space 34 for conveying gasses from the inertial separator 26 to the central space 34. Thus the gasses are circulated in a spiraled path to the central space 34 to remove the aerosol from the gasses. This device, commonly referred to as a diffusion battery, further reduces the flow rate of the gasses by forcing the gasses to travel along the spiraled path. Remaining aerosol of up to 0.1 microns in size are removed from the gasses when impacting the sheet 32 of the diffusion battery. Due to gravitational forces, the removed aerosol drop to the base 17 for purging through the second drain 21. An alternate embodiment would not have drain 21 and the aerosol would be purged through drain 19. It is also within the scope of this invention to have only one drain and a collection basin which would obviate the need for drains 18 and 21. However, in the preferred embodiment at least two drains are used. A distance 42 between each successive spiraled sheet 32 is defined by the flow rate of the gasses and the size of the aerosol remaining in the gasses. The distance 42 can be tuned to optimize separation depending upon whether an engine is producing relatively clean or dirty crankcase gasses. The substrate is contemplated to be made of Teflon to take advantage of the electrophoretic effects of charged aerosol to enhance aerosol diffusion. However, other equally effective substrates may be used.

A thermal interception tube 36 located in the central space 34 receives the gasses and has a porous tube wall 38 for the gasses to pass therethrough and a tube opening 40 at one end. The outlet 24 through the top portion 14 is in communication with the opening 40 for egress of the gasses. Accordingly, the gasses are filtered through a filter defined by the porous tube wall 38 disposed in the central space 34. After filtration, the gasses are returned to an air intake manifold. The pore size is contemplated to be 0.2 microns. However, different pore sizes can be used to meet different intake manifold requirements. The dimensions of the tube wall 38 are defined by the required gas flow rate and the maximum allowable pressure differential between the inside and the outside of the tube 36. Additionally, the tube wall 38 is contemplated to be stainless steel, but not to the exclusion of other materials. A sintering process which involves heating powdered steel to form a solid substrate is most affective for the manufacture of the porous tube wall 38. The sintering process will yield pores encompassing up to 42% of the tube wall 38.

The thermal interception tube 36 includes a chiller 44 for reducing the temperature of the thermal interception tube 36 and causing condensation on the tube wall 38. A peltier effect chiller is contemplated for reducing tube wall 38 temperature, but not to the exclusion of other types of chillers. The chiller 44 includes terminals 46 affixed to the tube wall 38. The chiller 44 reduces the tube wall 38 temperature from the original temperature of the gasses, which is approximately the temperature of the crankcase, to a range of 50 to 60 degrees Fahrenheit. The reduced temperature of the tube wall 38 cools the gasses at the filter in the central space 34 causing condensation of moisture and low boiling point hydrocarbons suspended in the gasses. Condensation will accumulate on both the inside and the outside surfaces of the tube wall 38. Additionally, the condensed moisture further strips aerosol from the gasses. Accumulated condensation bearing the weight of the stripped aerosol will run down the tube wall 38 and collect at the base 16 of the housing 11.

The thermal interception tube 36 includes a controller 48 in communication with the chiller 44 for sensing the temperature of the thermal interception tube 36 for maintaining the temperature within a desired range. A process integral derivative (PID) controller is contemplated to maintain the tube wall 38 temperature within the desired range. A thermocouple 50 attached to the tube wall 38 communicates to the controller to control the tube wall 38 temperature. Accordingly, the controller 48 signals the chiller to make adjustments to the tube wall 38 temperature as is known in the art.

The thermal interception tube 36 includes a first seal 52 at an upper end of the tube 36 and a second seal 54 at a lower end of the tube 36. The two seals 52,54 prevent gasses from entering the inside of the tube 36 without having first passed through the tube wall 38. Accordingly, the first seal 52 seals the upper end of the tube 36 to the top portion 22 and the second seal 54 seals the lower end of the tube 36 to the base 16. An O-ring seal is contemplated, but not to the exclusion of other types of seals.

The thermal interception tube 36 is in communication with the second drain 19 for draining aerosol and fluids extracted from the gasses. The base 16 of the housing 11 has a conical shape with a downward pointing apex 17. The second drain 19 is located at the apex 17 of the base 16. Additionally, aerosol removed while the gasses circulate through the diffusion battery drop to the base 16 due to gravitational forces. The aerosol flow along the base 16 through the spiraled path and collect at the apex 17 above the second drain 21. The condensation and the aerosol that have accumulated at the lower end of the tube 36 drain to an engine sump through the second drain 19.

The first drain 18 includes a first valve 56, the second drain 19 includes a second valve 58 and the third drain 21 includes a third valve 59 for draining aerosol and fluids extracted from the gasses. The aerosol and fluids extracted from the gasses are purged through the drains 18,19 and 21. The drains 18,19 and 21 are connected to an engine sump wherein the aerosol and fluids are deposited. The valves 56,58 and 59 receive input from the engine to open to drain the fluids and extracted aerosol when the engine shuts off. The valves 56,58 and 59 are contemplated to be either electronic or solenoid, however, any automatic valve will suffice. Thus, the assembly is self cleaning and does not require removal or replacement.

A additional embodiment for the drains 18,19, and 21 includes parallel drain lines (not shown) leading from the first and second drains 18,19, and 21 and returning to the crankcase below the lowest engine oil level. The oil pressure in the crank case prevents the gasses from back flowing from the first drain 18 through the drains 19 and 21. This facilitates eliminating the valves 56,58 and 59.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

INDUSTRIAL APPLICABILITY

This invention is useful for providing filtration for crankcase gasses from an internal combustion engine for reintroduction to an air intake manifold. The aerosol removal device eliminates the need for filter media replacement and for maintenance by providing the means for purging particulate filtrate. Several stages of mechanical filtration function in combination with strategically spaced drains for purging particulate filtrate to an engine sump.

The description given above discloses the currently preferred embodiments of this invention. Variations and modifications to the disclosed embodiments may become apparent to those skilled in the art that do not necessarily depart from the preview and spirit of this invention. The scope of legal protection given to this invention can only be determined by studying the following claims.

What is claimed is:

1. An assembly for removing aerosol from crankcase gasses being returned to an air intake manifold comprimising:

a housing having a housing wall defining a top portion and a base with at least one drain, an inlet line extending through said housing wall for communicating with a crankcase, an outlet line extending through said top portion for communicating with an air intake manifold, an inertial separator attached to said inlet line and having a screen through which the gasses pass and having an impacter plate for obstructing aerosol suspended in the gasses, a sheet wound in spaced convolutions to define a spiraled path from the exterior to a central space for conveying gasses from inertial separator to said central space, and a thermal interception tube located in said central space for receiving gasses, said tube having a porous wall for gasses to pass therethrough, an opening at one end for egress of gasses, and a chiller for reducing the temperature of said thermal interception tube and causing condensation on said tube wall.

2. An assembly as set forth in claim 1, wherein said thermal interception tube includes a controller in communication with said chiller for sensing the temperature of said thermal interception tube for maintaining the temperature within a desired range.

3. An assembly as set forth in claim 2, wherein said thermal interception tube includes a first seal at the upper end of said tube.

4. An assembly as set forth in claim 3, wherein said thermal interception tube includes a second seal at a lower end of said tube.

5. An assembly as set forth in claim 4, wherein said thermal interception tube is in communication with a second drain for draining aerosol and fluids extracted from the gases.

6. An assembly as set forth in claim 5, wherein said base of said housing has a conical shape with a downward pointing apex.

7. An assembly as set forth in claim 6, wherein said second drain is located at said apex of said base.

8. An assembly for removing aerosol from crankcase gasses being returned to an air intake manifold comprising:

a housing having a housing wall defining a top portion and a base with at least one drain, an inlet line extending through said housing wall for communicating with a crankcase, an outlet line extending through said top portion for communicating with an air intake manifold, an inertial separator attached to said inlet line and having a screen through which the gasses pass and having an impacter plate for obstructing aerosol suspended in the gasses, a sheet wound in spaced convolutions to define a spiraled path from the exterior to a central space for conveying gasses from said inertial separator to said central space, thermal interception tube located in said central space for receiving gasses, said tube having a porous wall for gasses to pass therethrough, an opening at one end for egress of gasses, and first and second drains wherein said first drain includes a first valve, and said second drain includes a second valve for draining aerosol and fluids extracted from the gasses.

9. An assembly as set forth in claim 8, including a third drain for purging aerosol and fluids from gasses circulated through said sheet.

10. A method for separating aerosol from crankcase gases comprising the steps of:

passing the gases through a screen and impacting the gases against an impacter plate for obstructing aerosol suspended in the gases, circulating the gases in a spiraled path to a central space to remove aerosol from the gases, filtering the gases through a thermal interception tube disposed in the central space, returning the gases to an air intake manifold, and cooling the gases at the thermal interception tube in the central space.

11. A method as set forth in claim 10, wherein said step of cooling the gasses includes condensing moisture in the gasses.

12. A method as set forth in claim 11, wherein said step of condensing moisture in the gasses includes stripping aerosol from said gasses.

13. A method as set forth in claim 12, including the step of purging aerosol and moisture extracted from the gasses through at least one drain.

14. An assembly for removing aerosol from crankcase gasses being returned to an air intake manifold comprising:

a housing having a housing wall, a top and a base defining an inner cavity, at least one drain communicating with said inner cavity, at least one drain communicating with said inner cavity, an inlet line extending through said housing wall into said cavity, said inlet line being adapted for connection to a crankcase, an inertial separator adjacent said inlet line for obstructing aerosol suspended in the gasses, said obstructed aerosol entering said first drain, a diffusion battery having a circuitous path for slowing the gasses and sequentially dropping aerosol of reduced size as the gas slows, the gas entering the diffusion battery and flowing along said circuitous path to a central space, and a thermal interception tube located in said central space for receiving gases, said thermal interception tube having a porous wall for gases to pass therethrough, an opening communicating with said outlet line for egress of gasses and a chiller for reducing the temperature of said thermal interception tube and causing condensation on said tube wall.

15. An assembly as set forth in claim, 14 wherein said thermal interception tube includes a controller in communication with said chiller for sensing the temperature of said thermal interception tube for maintaining the temperature within a desired range.

16. An assembly as set forth in claim 15, wherein said thermal interception tube includes a first seal at an upper end of said tube.

17. An assembly as sot forth in claim 16, wherein said thermal interception tube includes a second seal at a lower end of said tube.

* * * * *